(12) United States Patent
Chang et al.

(10) Patent No.: US 8,204,708 B2
(45) Date of Patent: Jun. 19, 2012

(54) SYSTEM AND METHOD FOR UPDATING A COMPENSATION VALUE OF A MEASUREMENT MACHINE

(75) Inventors: Chih-Kuang Chang, Taipei Hsien (TW); Hua-Wei Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 412 days.

(21) Appl. No.: 12/547,626

(22) Filed: Aug. 26, 2009

(65) Prior Publication Data

US 2010/0169721 A1 Jul. 1, 2010

(30) Foreign Application Priority Data

Dec. 29, 2008 (CN) .......................... 2008 1 0306622

(51) Int. Cl.
*G01D 18/00* (2006.01)
*G06F 19/00* (2006.01)
(52) U.S. Cl. ........................... 702/85; 702/105; 702/119
(58) Field of Classification Search .................. 702/84, 702/85, 105, 119; 700/54, 57, 78, 165, 195; 382/106; 714/57
See application file for complete search history.

(56) References Cited

U.S. PATENT DOCUMENTS 6,892,153 B2 * 5/2005 Puchtler ....................... 702/105

FOREIGN PATENT DOCUMENTS

CN 1782941 A 6/2006

OTHER PUBLICATIONS

"Digital Control System of WinCNC,"Periodical of Beijing DFJZH Mechanical & Electrical technology Co.,Ltd,Dec. 20, 2002,pp. 13,24,110,and 115,China.

* cited by examiner

*Primary Examiner* — John H Le
(74) *Attorney, Agent, or Firm* — Altis Law Group, Inc.

(57) ABSTRACT

A system and method for updating a compensation value of a measurement machine provides a host computer to generate an authorization code document according to an ID input by a user and encrypts the authorization code document. A client computer decrypts the authorization code document, and obtains an authorization code, the input ID, and a valid date of the authorization code. If the input ID is the same as an ID of the measurement machine, and the authorization code has not expired, the compensation of the measurement machine can be updated by the client computer using the authorization code.

11 Claims, 5 Drawing Sheets

SYSTEM AND METHOD FOR UPDATING A COMPENSATION VALUE OF A MEASUREMENT MACHINE

BACKGROUND

1. Technical Field

Embodiments of the present disclosure relate to information updating systems and methods, and more particularly to a system and method for updating a compensation value of a measurement machine.

2. Description of Related Art

A measurement machine may be used to measure various dimensions of an object, such as a computer component. However, due to internal error, measuring machines may need to receive a numerical value, known as a compensation value, to compensate for internal errors of the measurement machine. At present, updating the compensation value is often done manually, which reduces efficiency and may cause incorrect measurements.

Therefore, an effective system and method is needed to overcome the above-described shortcomings.

DETAILED DESCRIPTION

All of the processes described below may be embodied in, and fully automated via, functional modules executed by one or more general purpose processors. The functional modules may be stored in any type of computer-readable medium or other computer storage device. Some or all of the methods may alternatively be embodied in specialized computer hardware or communication apparatus.

Figure 1:
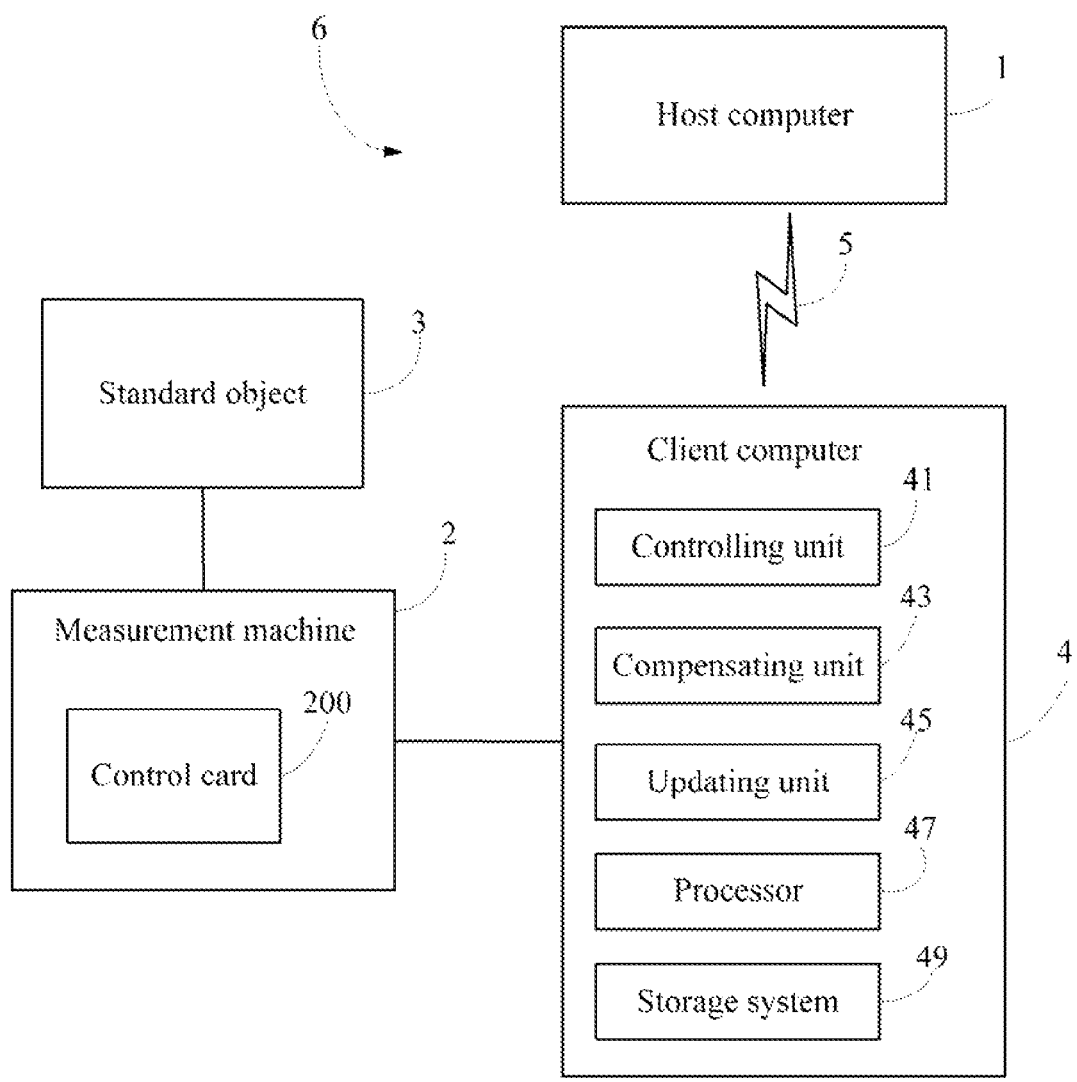
FIG. 1 is a block diagram of one embodiment of a system for updating a compensation value of a measurement machine.

FIG. 1 is a block diagram of one embodiment of a system 6 for updating a compensation value of a measurement machine 2. The system 6 includes a host computer 1, at least one measurement machine 2 (only one shown in FIG. 1), and a standard object 3. For example, the standard object 3 may be a measuring block. Each measurement machine 2 includes a control card 200. The control card 200 stores a unique identifier (ID) of the measurement machine 2. The host computer 1 generates an authorization code document for each measurement machine 2 according to a user input ID and encrypts the authorization code document. The authorization code document includes an authorization code, the input ID, and a valid date of the authorization code. In one embodiment, the authorization code document may be encrypted using a symmetric algorithm.

The host computer 1 is connected to a client computer 4 via a network 5. In one embodiment, the network 5 may be the Internet or an Intranet.

In one embodiment, the client computer 4 may include a controlling unit 41, a compensating unit 43, an updating unit 45. It may be understood that one or more specialized or general purpose processors, such as a processor 47, may be used to execute one or more computerized codes of the function units 41-45. The one or more computerized codes of the functional units 41-45 may be stored in a storage system 49 of the client computer 4. The storage system 49 also stores a compensation value of the measurement machine 2 and an updating time of the compensation value. In one embodiment, the updating time is a timestamp of the last update of the compensation value.

The controlling unit 41 controls the measurement machine 2 to measure a dimension of the standard object 3, to obtain a measured value of the standard object 3. The compensating unit 43 takes a difference between the measured value and a real value of the standard object 3 to obtain a new compensation value of the measurement machine 2. For example, if the measured value is 9.9 and the real value is 10, the difference between the measured value and the real value is 0.01. The new compensation value may be calculated by adding the difference to a current compensation value stored in the storage system 49. The updating unit 45 decrypts the encrypted authorization code document, and updates the compensation stored in the storage system 49.

Figure 2:
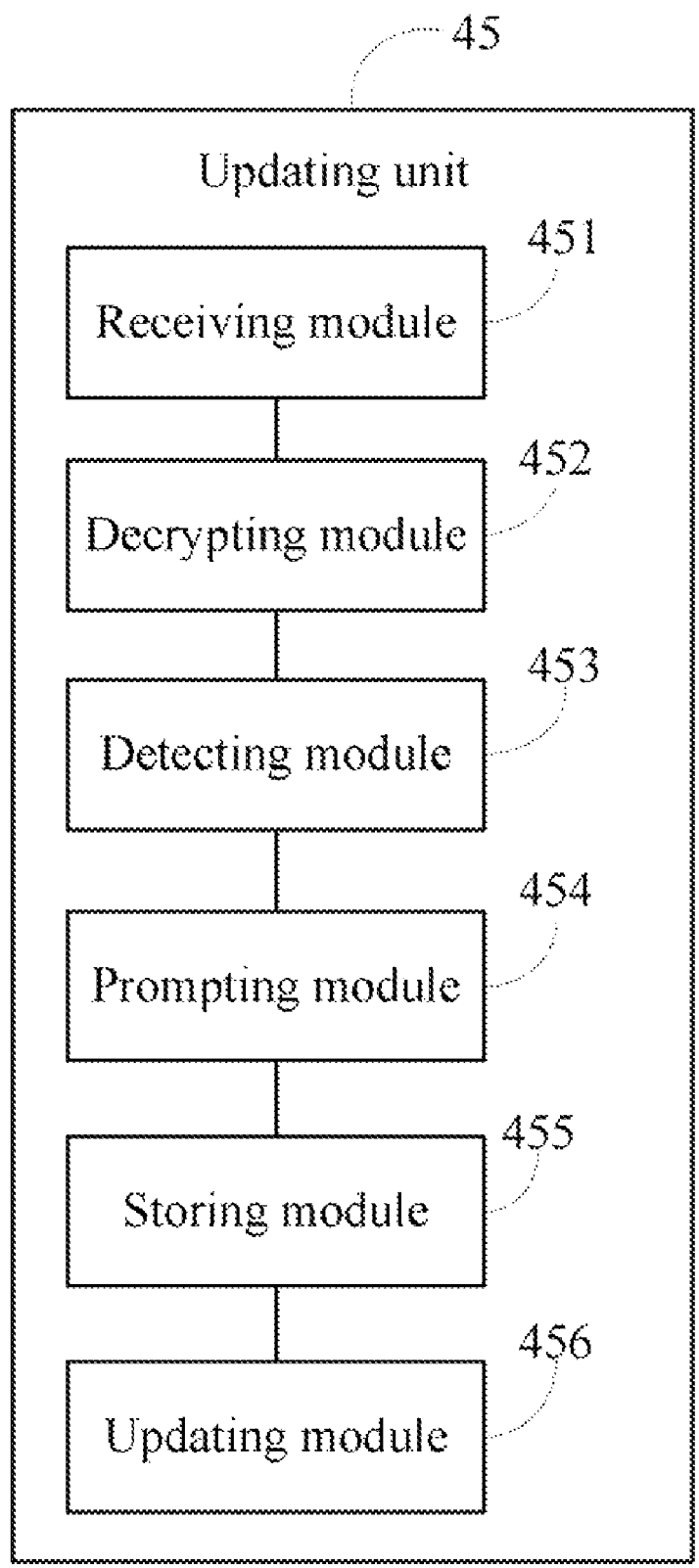
FIG. 2 is a block diagram of one embodiment of function modules of an updating unit in FIG. 1.

FIG. 2 is a block diagram of one embodiment of function modules of a updating unit in FIG. 1. In one embodiment, the updating unit 45 includes a receiving module 451, a decrypting module 452, a detecting module 453, a prompting module 454, a storing module 455, and an updating module 456.

The receiving module 451 receives the encrypted authorization document sent by the host computer 1. The decrypting module 452 decrypts the encrypted authorization document, and obtains the authorization code, the user input ID, and the valid dates of the authorization code.

The detecting module 453 detects if the user input ID is the same as the ID of the measurement machine 2. The prompting module 454 displays that the authorization code is invalid if the user input ID is different from the ID of the measurement machine 2.

The detecting module 453 also detects if the authorization code exists in the control card 200. The storing module 455 stores the authorization code into the control card 200 if the authorization code does not exist in the control card 200.

The detecting module 453 further detects if the authorization code has expired if the authorization code exists in the control card 200. The prompting module 454 also displays that the authorization code is invalid if the authorization code has expired. For example, if a working time of the authorization code is 10 days while the valid date is 8 days, the prompting module 454 displays that the authorization code is invalid.

The detecting module 453 further detects if the a system time of the client computer 3 lags behind the updating time stored in the storage system 49. The prompting module 454 displays that the authorization code is validated successfully if the system time of the client computer 3 lags behind the updating time. If the system time of the client computer 3 does not lag behind the updating time, the prompting module 454 prompts the user to update the system time, and displays that the authorization code is invalid. For example, the system of the computer time may be 13 o'clock in Dec. 16, 2008, while the updating time stored in the storage system 49 may be 16 o'clock in Dec. 15, 2008. In one embodiment, the prompting module 454 may display a dialog box on a display to show that the authorization code has been verified successfully. If the updating time stored in the storage system 49 is 12 o'clock in Dec. 17, 2008, the prompting module 454 may display a dialog box to prompt that the authorization code fails to be verified. If the system time of the client computer 3 lags behind the updating time stored in the storage system 49, the updating module 456 updates the compensation value stored in the storage system 49 with the new compensation value. The storing module 455 stores a system time into the storage system 49 as a new updating time when the compensation value is updated.

Figure 3:
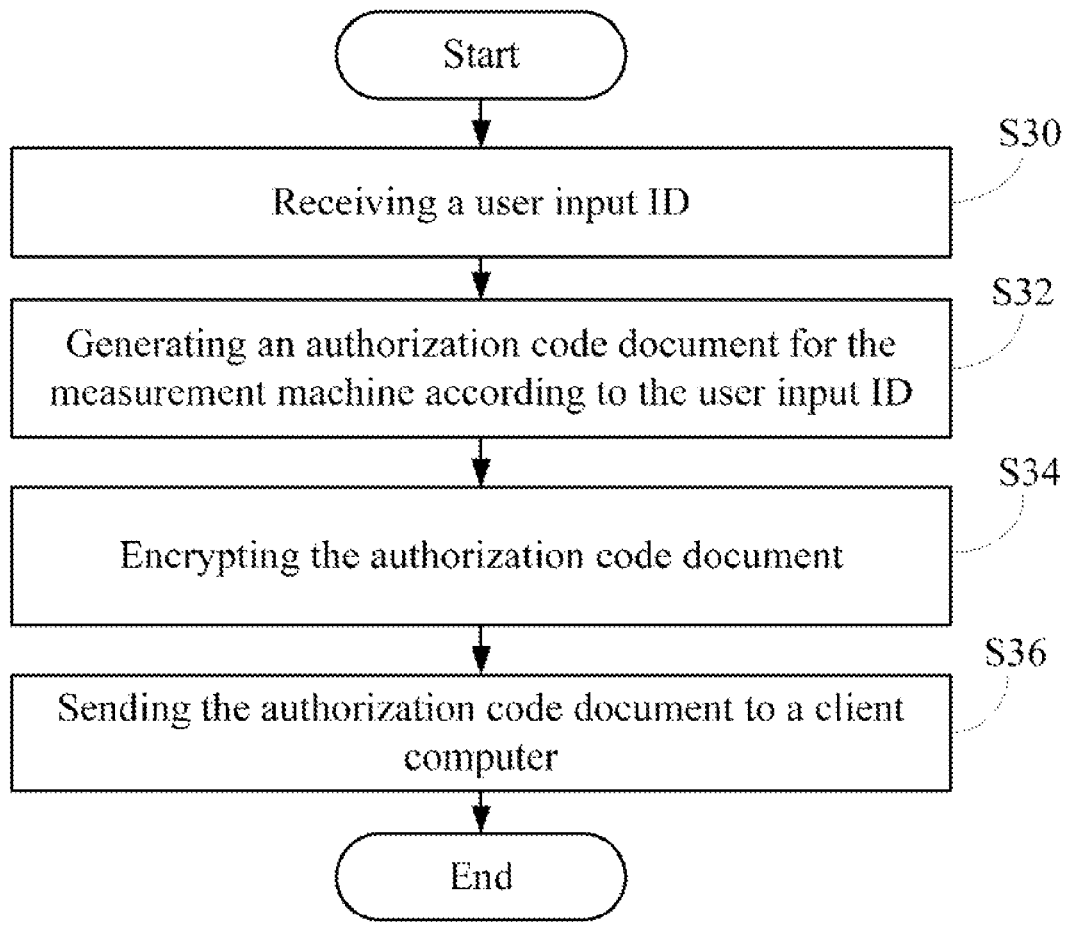
FIG. 3 is a flowchart of one embodiment of a method for generating an authorization code document by a host computer.

FIG. 3 is a flowchart of one embodiment of a method for generating an authorization code document by a host computer. Depending on the embodiment, additional blocks may be added, others removed, and the ordering of the blocks may be changed.

In block S30, the host computer 1 receives an ID input by a user.

In block S32, the host computer 1 generates an authorization code document according to the input ID. The authorization code document includes an authorization code, the user input ID, and the valid date of the authorization code.

In block S34, the host computer 1 encrypts the authorization code document. In one embodiment, the authorization document is encrypted using symmetric algorithm.

In block S36, the host computer 1 sends the encrypted authorization code document to the client computer 3.

Figure 4:
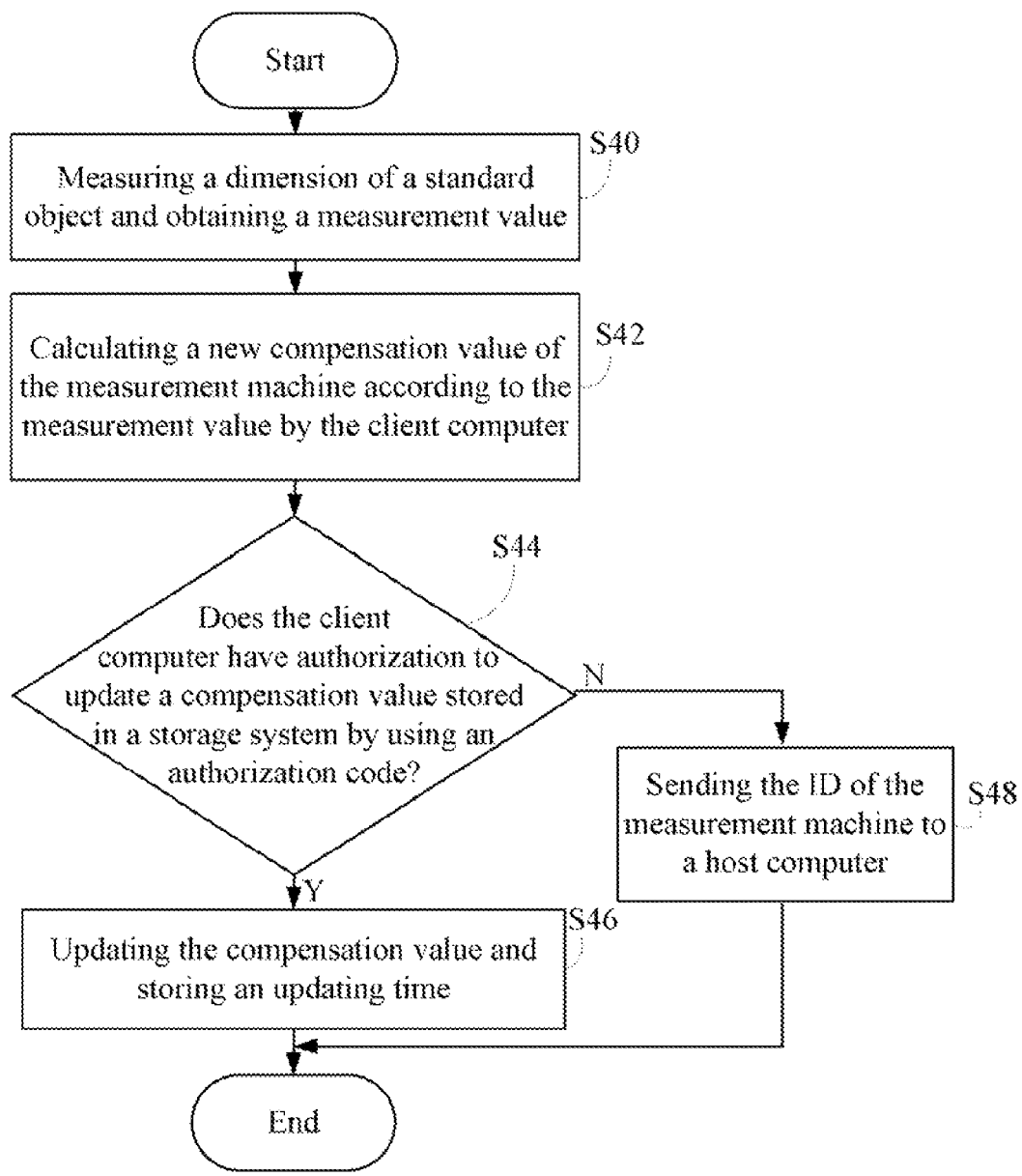
FIG. 4 is a flowchart of one embodiment of a method for updating a compensation value of a measurement machine.

FIG. 4 is a flowchart of one embodiment of a method for updating a compensation value of a measurement machine. Depending on the embodiment, additional blocks may be added, others removed, and the ordering of the blocks may be changed.

In block S40, the controlling unit 41 controls the measurement machine 2 to measure a dimension of the standard object 3, and obtains a measured value of the standard object 3.

In block S42, the compensating unit 43 calculates a difference between the measured value and a real value of the standard object 3 to obtains a new compensation value of the measurement machine 2.

In block S44, the updating unit 45 verifies the authorization code to detect if the client computer 3 has authorization to update the compensation value stored in the storage system 49 by using the authorization code. In one embodiment, if the authorization code is validated successfully, the client computer 3 may have authorization to update the compensation value stored in the storage system 49 using the authorization code. If the authorization code is invalid, the client computer 3 may have no authorization to update the compensation value using the authorization code. If the authorization code has been verified successfully, the procedure goes to block S46. If the authorization code has not been verified successfully, the procedure goes to block S48.

In block S46, the updating module 456 updates the compensation value stored in the storage system 49 with the new compensation value. The storing module 455 stores a system time when the compensation value is updated as a new updating time into the storage system 49.

In block S48, the prompting module 454 sends the ID of the measurement machine 2 stored in the control card 200 to the host computer 1 to display that the client computer 3 fails to update the compensation value of the measurement machine 2.

Figure 5:
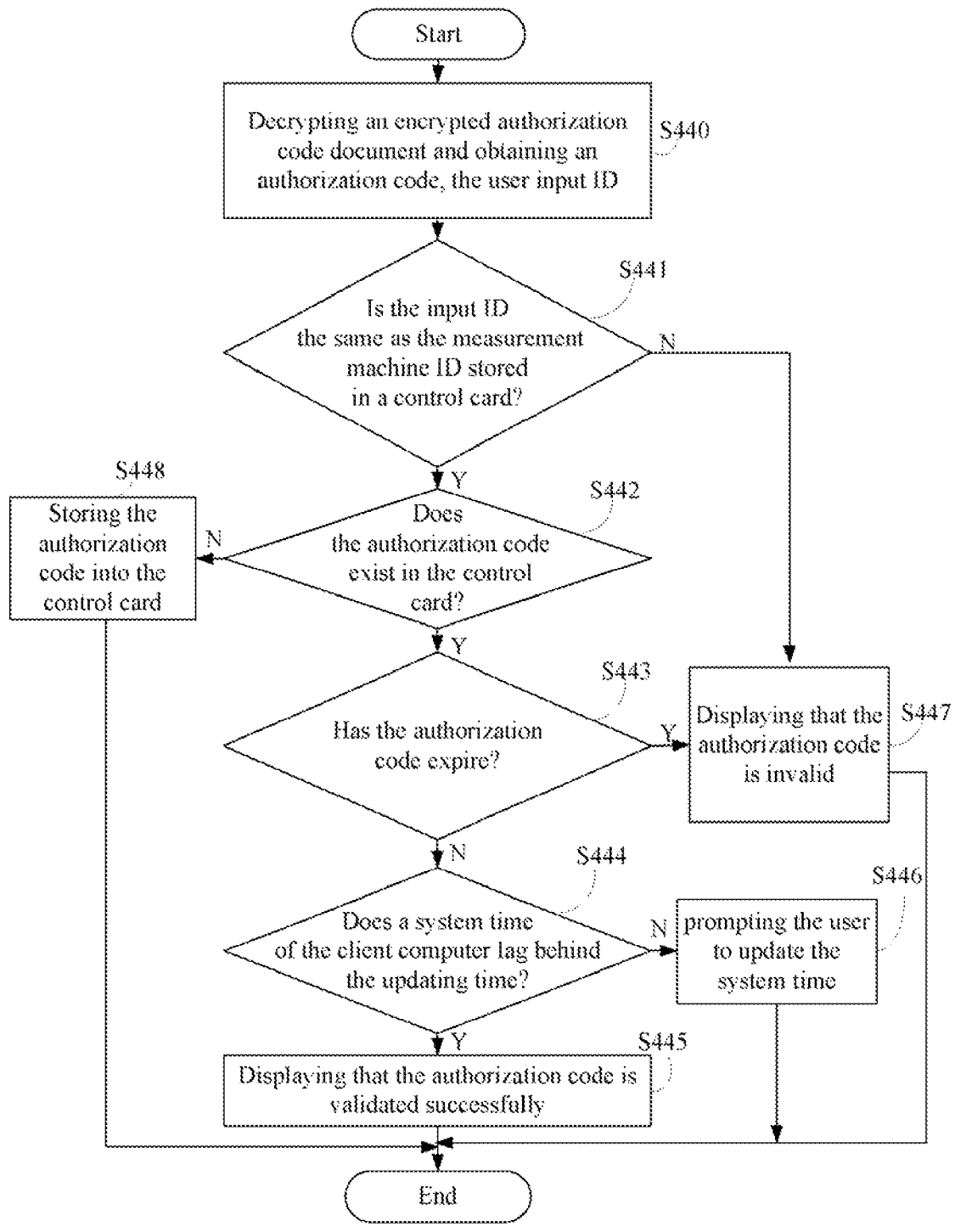
FIG. 5 is a flowchart of one embodiment of a detailed description of block S44 in FIG. 4.

FIG. 5 is a flowchart of one embodiment of a detailed description of block S44 in FIG. 4. Depending on the embodiment, additional blocks may be added, others removed, and the ordering of the blocks may be changed.

In block S440, the decrypting module 452 decrypts the encrypted authorization document sent from the host computer, and obtains the authorization code, the user input ID, and the valid date of the authorization code.

In block S441, the detecting module 453 detects if the input ID is the same as the ID stored in the control card 200. If the user input ID is the same as the ID stored in the control card 200, the procedure goes to block S442. If the user input ID is different from the ID stored in the control card 200, the procedure goes to block S447.

In block S442, the detecting module 453 detects if the authorization code exists in the control card 200. If the authorization code exists in the control card 200, the procedure goes to block S443. If the authorization code does not exist in the control card 200, the procedure goes to block S448.

In block S443, the detecting module 453 detects if the authorization code has expired according to the valid date. If the authorization code has not expired, the procedure goes to block S444. If the authorization code has expired, the procedure goes to block S447.

In block S444, the detecting module 453 detects if a system time of the client computer 3 lags behind the updating time stored in the storage system 49. If the system time of the client computer 3 lags behind the updating time stored in the storage system 49, the procedure goes to block S445. If the system time of the client computer 3 does not lag behind the updating time stored in the storage system 49, the procedure goes to block S446.

In block S445, the prompting module 454 displays that the authorization code is validated successfully.

In block S446, the prompting module 454 displays that the authorization code is invalid, and prompts the user to update the system time of the client computer 3.

In block S447, the prompting module 454 displays that the authorization code is invalid.

In block S448, the storing module 445 stores the authorization code, the ID of the measurement machine 2, and the valid date of the authorization code into the control card 200.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for updating a compensation value of a measurement machine, the system comprising:
   at least one processor;
   a storage system storing a compensation value of the measurement machine and one or more programs executable by the at least one processor, the one or more programs comprising:
   a controlling unit to control the measurement machine to measure a dimension of a standard object, and to obtain a measured value of the standard object;
   a compensating unit to calculate a difference between the measured value and a real value of the standard object to obtain a new compensation value of the measurement machine;
   a decrypting module to decrypt an encrypted authorization document which is generated by a host computer and obtain an authorization code and a user input identifier (ID) from the decrypted authorization document;
   an updating module to update the compensation value stored in the storage system with the new compensation value if the user input ID is the same as an ID stored in a control card of the measurement machine and the authorization code has expired;
   a detecting module to detect if a system time of the client computer lags behind an updating time of the compensation value; and
   a prompting module to display that the authorization code is validated successfully if the system time of the client computer lags behind the updating time, or to prompt a user to correct the system time of the client computer if the system time does not lag behind the updating time.

2. The system of claim 1, wherein the one or more programs further comprise a storing module to store the authorization code, the ID of the measurement machine, and a valid date of the authorization code into the control card.

3. The system of claim 1, wherein the updating module is also to store the updating time of the compensation value stored in the storage system.

4. A computer-based method for updating a compensation value of a measurement machine, the method comprising:
   (a) controlling the measurement machine to measure a dimension of a standard object and obtaining a measured value of the standard object;
   (b) calculating a difference between the measured value and a real value of the standard object to obtain the new compensation value of the measurement machine;
   (c) decrypting an encrypted authorization document which is generated by a host computer and obtaining an authorization code and a user input identifier (ID) from the decrypted authorization document;
   (d) updating a compensation value stored in a storage system of the client computer with the new compensation value if the user input ID is the same as an ID stored in a control card of the measurement machine and the authorization code has expired;
   (e) detecting if a system time of the client computer lags behind the updating time; and
   (f) displaying that the authorization code is validated successfully if the system time of the client computer lags behind the updating time.

5. The method of claim 4, further comprising: storing the authorization code, the ID of the measurement machine, and a valid date of the authorization code into the control card.

6. The method of claim 4, further comprising: storing the updating time of the compensation value stored in the storage system.

7. The method of claim 4, further comprising:
   prompting a user to correct the system time of the client computer if the system time does not lag behind the updating time.

8. A computer-readable medium having stored therein instructions that, when executed by a client computer, cause the client computer to perform a method for updating compensation value of a measurement machine, the method comprising:
   (a) controlling the measurement machine to measure a dimension of a standard object and obtaining a measured value of the standard object;
   (b) calculating a difference between the measured value and a real value of the standard object to obtain the new compensation value of the measurement machine;
   (c) decrypting an encrypted authorization document which is generated by a host computer and obtaining an authorization code and a user input identifier (ID) from the decrypted authorization document;
   (d) updating a compensation value stored in a storage system of the client computer with the new compensation value if the user input ID is the same as an ID stored in a control card of the measurement machine and the authorization code has expired;
   (e) detecting if a system time of the client computer lags behind the updating time and
   (f) displaying that the authorization code is validated successfully if the system time of the client computer lags behind the updating time.

9. The medium of claim 8, further comprising: storing the authorization code, the ID of the measurement machine, and a valid date of the authorization code into the control card.

10. The medium of claim 8, further comprising: storing the updating time of the compensation value stored in the storage system.

11. The medium of claim 10, further comprising:
    prompting a user to correct the system time of the client computer if the system time does not lag behind the updating time.

\* \* \* \* \*